US008908339B2

(12) United States Patent
Kinsel

(10) Patent No.: US 8,908,339 B2
(45) Date of Patent: Dec. 9, 2014

(54) METHODS AND APPRATUS FOR GROUND FAULT CIRCUIT INTERRUPT DETECTION USING A SINGLE TRANSFORMER

(71) Applicant: Hugh T. Kinsel, Sugar Hill, GA (US)

(72) Inventor: Hugh T. Kinsel, Sugar Hill, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 13/926,162

(22) Filed: Jun. 25, 2013

(65) Prior Publication Data

US 2013/0279050 A1 Oct. 24, 2013

Related U.S. Application Data

(63) Continuation of application No. 12/779,406, filed on May 13, 2010, now Pat. No. 8,526,143.

(60) Provisional application No. 61/216,234, filed on May 14, 2009.

(51) Int. Cl.
 H02H 3/16 (2006.01)
 H02H 3/33 (2006.01)

(52) U.S. Cl.
 CPC .............. *H02H 3/162* (2013.01); *H02H 3/331* (2013.01)
 USPC .......................................................... 361/42

(58) Field of Classification Search
 USPC .......................................................... 361/42
 See application file for complete search history.

(56) References Cited

U.S. PATENT DOCUMENTS

| | | | | |
|---|---|---|---|---|
| 3,548,259 A * | 12/1970 | McDonald | ...................... | 361/45 |
| 3,953,766 A * | 4/1976 | Howell et al. | ................... | 361/45 |
| 4,150,411 A * | 4/1979 | Howell | ......................... | 361/45 |
| 4,276,510 A * | 6/1981 | Tompkins et al. | ............ | 324/127 |
| 4,378,579 A * | 3/1983 | Hudson, Jr. | ...................... | 361/45 |
| 5,940,256 A * | 8/1999 | MacKenzie et al. | ............ | 361/42 |
| 8,526,143 B2 * | 9/2013 | Kinsel | ............... | 361/42 |
| 2009/0040666 A1* | 2/2009 | Elms et al. | ...................... | 361/42 |
| 2010/0060468 A1* | 3/2010 | Elms et al. | .................... | 340/638 |
| 2010/0060469 A1* | 3/2010 | Hetzmannseder et al. | ... | 340/639 |
| 2010/0309592 A1* | 12/2010 | Kinsel | ............... | 361/50 |
| 2011/0085272 A1* | 4/2011 | Schweitzer et al. | ............ | 361/47 |
| 2013/0279050 A1* | 10/2013 | Kinsel | ............... | 361/49 |

* cited by examiner

*Primary Examiner* — Ronald W Leja

(57) ABSTRACT

A device is provided for use with an AC power system having a line conductor, a neutral conductor and a transformer, the line conductor and the neutral conductor are coupled between a source and a load, and the transformer includes a first primary winding coupled in series with the line conductor, a second primary winding coupled in series with the neutral conductor, and a secondary winding. The device includes a first circuit coupled to the secondary winding, providing a first detection signal if a current from the line conductor to ground exceeds a first predetermined threshold, and a second circuit coupled to the secondary winding, having a source that provides an AC signal at a specified amplitude and a specified frequency to the secondary winding. The second circuit provides a second detection signal if an impedance between the neutral conductor and ground is less than a second predetermined threshold.

20 Claims, 5 Drawing Sheets

METHODS AND APPRATUS FOR GROUND FAULT CIRCUIT INTERRUPT DETECTION USING A SINGLE TRANSFORMER

REFERENCE TO RELATED APPLICATIONS

This application is continuation application of co-pending U.S. patent application Ser. No. 12/779,406 entitled "Methods and Apparatus for Ground Fault Circuit Interrupt Detection Using a Single Transformer" and which claims the benefit of U.S. Provisional Patent Application Ser. No. 61/216,234, filed May 14, 2009, which is incorporated by reference herein in its entirety.

BACKGROUND

This application relates generally to methods and apparatus for ground fault circuit interrupt ("GFCI") detection. More particularly, this application relates to methods and apparatus for GFCI detection using a single transformer to detect ground current faults and grounded neutral faults in electrical circuit branches of AC power systems.

Electrical circuit branches of single-phase AC power systems typically use electrical cables that include a line conductor and a neutral conductor coupled between a source and a load, with the neutral conductor grounded at the source. GFCI devices are installed in such circuit branches to interrupt power upon detection of ground current faults from the line conductor to ground at the load, as well as grounded neutral faults (e.g., low impedance connection faults) between the neutral conductor and ground at the load. GFCI devices provide safety protection from electrocution, and are primarily used in receptacles in kitchens, bathrooms and outdoor areas where water or moisture can pose a risk of electrocution. GFCI devices are also used in circuit breakers that protect these same areas.

GFCI devices typically use a differential current transformer to sense current imbalances in the line and neutral conductors resulting from ground leakage current from the line conductor returning to the source through an unintended ground circuit path other than the neutral conductor. To prevent injury from electrical shock, the GFCI device must initiate circuit interruption when the current differential in the line and neutral conductors is as low as 5 milliamps.

If a grounded neutral fault occurs, the differential current transformer may not detect the true magnitude of ground leakage current. In particular, because the neutral conductor is typically grounded at the source, a portion of the ground leakage current may return to the source through the neutral conductor. As a result, the current differential in the differential current transformer would not accurately correspond to the actual magnitude of the ground leakage current. Thus, a grounded neutral fault may desensitize the differential current sensor such that the GFCI device would trip only in response to considerably higher ground leakage current levels.

To address this issue, many previously known GFCI devices use a second transformer on the neutral conductor to detect grounded neutral faults. In such devices, if a low impedance connection fault exists between the neutral conductor and ground, the GFCI device forms an oscillator whose output signal is coupled to the differential current transformer using the second transformer. The oscillator signal is then used to detect grounded neutral faults. Upon detection of a grounded neutral fault, the GFCI device interrupts power in the AC power system. Such two-transformer GFCI devices require significant space to accommodate both transformers, and also incur the added cost of the second transformer.

To overcome these disadvantages, some previously known GFCI devices use a single transformer to detect ground current faults and grounded neutral faults. For example, Howell U.S. Pat. No. 4,001,646, titled "Ground Fault Circuit Interrupter Utilizing A Single Transformer," describes a GFCI device that uses a single transformer to detect ground current faults and grounded neutral faults. In particular, Howell uses a negative resistance network to form an oscillation signal that grows unless a low impedance connection fault exists between the neutral conductor and ground. In this regard, Howell's GFCI device is fairly complex and cumbersome.

In addition, previously known two-transformer and single-transformer GFCI devices typically have little control over the magnitude or frequency of the oscillator signals used to detect grounded neutral faults. As a result, such devices may not provide consistent and reliable grounded neutral fault detection. Accordingly, improved GFCI devices are desirable.

SUMMARY

In a first aspect of the invention, a device is provided for use with an AC power system that includes a line conductor, a neutral conductor and a transformer, the line conductor and the neutral conductor are each coupled between a source and a load, the neutral conductor is coupled to ground at the source, and the transformer includes a first primary winding coupled in series with the line conductor, a second primary winding coupled in series with the neutral conductor, and a secondary winding. The device includes a first circuit coupled to the secondary winding, wherein the first circuit provides a first detection signal if a current from the line conductor to ground exceeds a first predetermined threshold. The device also includes a second circuit coupled to the secondary winding, wherein the second circuit includes an AC signal source that provides an AC signal at a specified amplitude and a specified frequency to the secondary winding. The second circuit also provides a second detection signal if an impedance between the neutral conductor and ground is less than a second predetermined threshold.

In a second aspect of the invention, a GFCI device is provided for use with an AC power system that includes a line conductor, a neutral conductor and a transformer, the line conductor and the neutral conductor each coupled between a source and a load, the neutral conductor coupled to ground at the source, the transformer includes a first primary winding coupled in series with the line conductor, a second primary winding coupled in series with the neutral conductor, and a secondary winding. The device includes a ground current fault detector circuit coupled to the secondary winding. The ground current fault detector circuit provides a first detection signal if a current in the secondary winding exceeds a first predetermined threshold. The device also includes a grounded neutral fault detector circuit coupled to the secondary winding. The grounded neutral fault detector circuit: (a) includes an AC signal source that drives the secondary winding with an AC voltage at a specified amplitude and a specified frequency, (b) monitors a load current in the secondary winding, and (c) provides a second detection signal if the load current exceeds a predetermined threshold.

In a third aspect of the invention, a method is provided for GFCI detection for use with an AC power system that includes a line conductor, a neutral conductor and a transformer, the line conductor and the neutral conductor each coupled between a source and a load, the neutral conductor coupled to ground at the source. The transformer includes a first primary winding coupled in series with the line conductor, a second primary winding coupled in series with the neutral conductor, and a secondary winding. The method includes: a) for a first predetermined time interval, monitoring a current in the secondary winding, and providing a first detection signal if the monitored secondary current exceeds a first predetermined threshold; and (b) for a second predetermined time interval, driving the secondary winding with an AC voltage or current at a specified amplitude and a specified frequency, monitoring a load current in or voltage across the secondary winding, and providing a second detection signal if the load current or load exceeds a predetermined threshold, or if the load voltage is less than a predetermined threshold.

Other features and aspects of the present invention will become more fully apparent from the following detailed description, the appended claims and the accompanying drawings.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

The present invention provides improved GFCI devices that use a single transformer to detect ground current faults and grounded neutral faults in an AC power system. In particular, GFCI devices in accordance with this invention include a single transformer, a ground current fault detector circuit, and a grounded neutral fault detector circuit. For a first predetermined time interval, the ground current fault detector circuit monitors a first current in a secondary winding of the transformer to determine if ground leakage current exceeds a first predetermined threshold. If the first threshold is exceeded, the GFCI device interrupts the AC power system.

After the first predetermined time interval, the grounded neutral fault detector circuit drives the secondary winding of the transformer with an AC signal (e.g., an AC voltage) having a specified magnitude and frequency, and monitors a signal (e.g., a second current or voltage) in the secondary winding of the transformer to determine if a low impedance ground-to-neutral fault is less than a second predetermined threshold. The monitored AC signal may be used to determine the impedance from ground-to-neutral. If the monitored AC signal indicates that the impedance from ground-to-neutral is less than the second predetermined threshold, the GFCI device interrupts the AC power system.

After the second predetermined time interval, the grounded neutral fault detector circuit stops driving the secondary winding of the transformer, and the ground current fault detector circuit resumes monitoring the first current in the secondary winding for another first predetermined time interval to detect ground current faults. This process continues in an iterative manner to continuously detect ground current faults and grounded neutral faults using a single transformer.

Figure 1:
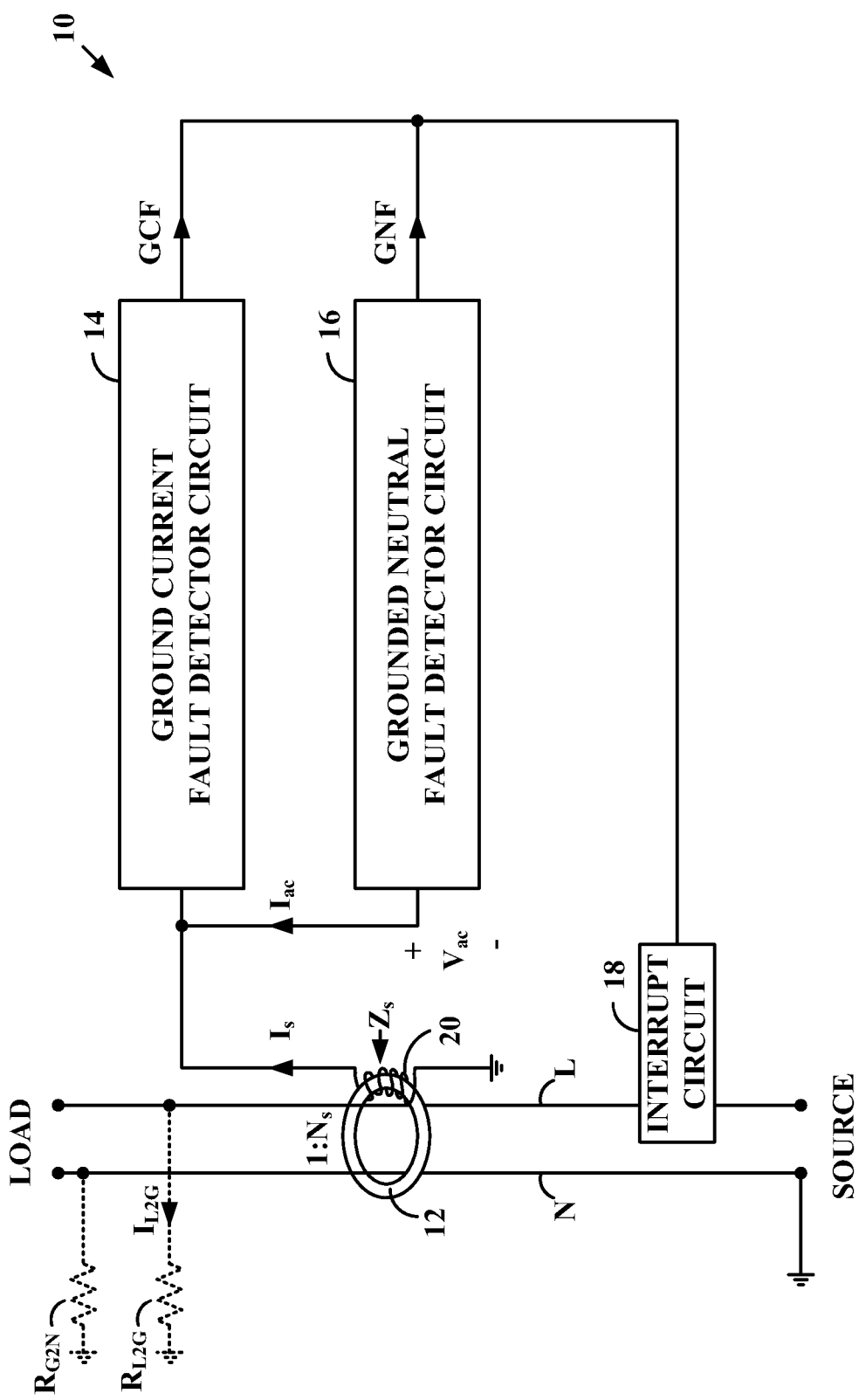
FIG. 1 is a block diagram of an exemplary GFCI device in accordance with this invention.

Referring to FIG. 1, a first exemplary GCFI device in accordance with this invention is described. GFCI device 10 includes a single transformer 12, a ground current fault detector circuit 14, a grounded neutral fault detector circuit 16, and an interrupt circuit 18. Transformer 12 is a differential current transformer having a toroidal core and a secondary winding 20. Persons of ordinary skill in the art will understand that other differential current transformers may be used.

A line conductor L and a neutral conductor N of an AC power system pass through the torroidal core of transformer 12 as single-turn primary windings. Persons of ordinary skill in the art will understand that line conductor L and neutral conductor N alternatively may be configured as multiple-turn primary windings of transformer 12. Line conductor L and neutral conductor N are each coupled between a source ("SOURCE") and a load ("LOAD"), and neutral conductor N is coupled to ground at the SOURCE.

Secondary winding 20 is coupled to an input terminal of ground current fault detector circuit 14, and an output terminal of grounded neutral fault detector circuit 16. Secondary winding 20 may be a single winding, having $N_s$ turns, as shown in FIG. 1. Alternatively, secondary winding 20 may include a first secondary winding having $N_{S1}$ turns coupled to an input terminal of ground current fault detector circuit 14, and a second secondary winding having $N_{S2}$ turns coupled to an input terminal of grounded neutral fault detector circuit 16. In still other embodiments, secondary winding 20 may include a single winding that includes a first tapped output coupled to an input terminal of ground current fault detector circuit 14, and a second tapped output coupled to an input terminal of grounded neutral fault detector circuit 16. Persons of ordinary skill in the art will understand that other similar winding configurations may be used.

In accordance with this invention, GFCI device 10 detects line-to-ground faults at the load, indicated as $R_{L2G}$, and low impedance ground-to-neutral faults at the load, indicated as $R_{G2N}$, by monitoring signals at secondary winding 20 of transformer 12.

In particular, ground leakage current $I_{L2G}$ flowing through a line-to-ground fault $R_{L2G}$ results in a differential current through transformer 12. The differential current causes secondary winding 20 to conduct a current $I_s$ that is related to the ground leakage current $I_{L2G}$ by the inverse of the number of turns $N_s$ on secondary winding 20:

$$I_S = \frac{I_{L2G}}{N_s} \quad (1)$$

Thus, by monitoring secondary current $I_s$, and knowing turns ratio $N_s$, ground leakage current $I_{L2G}$ can be determined from equation (1).

In addition, low impedance ground-to-neutral faults $R_{G2N}$ can be determined by driving secondary winding 20 with an AC signal (e.g., a voltage or current), and monitoring a corresponding load signal (e.g., a current or voltage) at secondary winding 20 of transformer 12. $R_{G2n}$ appears as a relatively low impedance at secondary winding 20. In particular, assuming that $R_{L2G}$ is much greater than $R_{G2N}$, the impedance $Z_s$ of transformer 12 appears to the secondary as:

$$Z_S = N_s^2 \times R_{G2N} \quad (2)$$

Thus, if secondary winding 20 is driven with an AC voltage $V_{ac}$ having a specified magnitude and frequency, the load current $I_{ac}$ required to drive secondary winding 20 is:

$$I_{ac} = \frac{V_{ac}}{Z_s} \quad (3)$$

Thus, by monitoring load current $I_{ac}$, $R_{G2N}$ can be calculated from equations (2) and (3).

In accordance with this invention, ground fault detector circuit 14 detects ground leakage current $I_{L2G}$ by monitoring differential current in transformer 12. In particular, for a first predetermined time interval T1, ground fault detector circuit 14 monitors current $I_s$ in secondary winding 20. First predetermined time interval T1 may be about 100 milliseconds, more generally between about 1 and 560 milliseconds, although other time intervals may be used. By monitoring secondary current $I_s$, and knowing turns ratio $N_s$, ground leakage current $I_{L2G}$ can be determined from equation (1). Thus, if monitored secondary current $I_s$ indicates that ground leakage current $I_{L2G}$ has exceeded a first predetermined value, ground current fault detector circuit 14 generates at an output terminal a first detection signal GCF which causes interrupt circuit 18 to open circuit line conductor L and thereby interrupt the AC power system.

For example, the GCF signal may normally be LOW, but may switch from LOW to HIGH if ground leakage current $I_{L2G}$ exceeds the first predetermined value. Persons of ordinary skill in the art will understand that the GCF signal alternatively may normally be HIGH, but may switch from HIGH to LOW if ground leakage current $I_{L2G}$ exceeds the first predetermined value.

After the first predetermined time interval T1, grounded neutral fault detector circuit 16 drives secondary winding 20 with an AC signal for a second predetermined time interval T2 to monitor low impedance ground-to-neutral faults $R_{G2N}$. Second predetermined time interval T2 may be about 5 milliseconds, more generally between about 0.1 and 17 milliseconds, although other durations may be used. For example, for second predetermined time interval T2, grounded neutral detector circuit 16 drives secondary transformer 20 with an AC voltage having a specified magnitude $V_{ac}$ and a specified frequency $f_d$.

The load current $I_{ac}$ required to drive secondary winding 20 equals $V_{ac}$ divided by the impedance $Z_s$ of transformer 12, as set forth above in equation (3). From equations (2) and (3), load current $I_{ac}$ may be written as:

$$I_{ac} = \frac{V_{ac}}{(N_s^2 \times R_{G2N})} \quad (4)$$

Ideally, $R_{G2N}$ is infinite, and load current $I_{ac}$ is zero. However, if a low impedance ground-to-neutral fault exists, $R_{G2N}$ is non-infinite, and may be quite low. As $R_{G2N}$ decreases, load current $I_{ac}$ increases. Thus, if load current $I_{ac}$ exceeds a predetermined value (indicating that $R_{G2N}$ has decreased below a second predetermined threshold), grounded neutral detector circuit 16 generates at an output terminal a second detection signal GNF, which causes interrupt circuit 20 to open circuit line conductor L and thereby interrupt the AC power system.

For example, the GNF signal may normally be LOW, but may switch from LOW to HIGH if load current $I_{ac}$ exceeds the second predetermined threshold. Persons of ordinary skill in the art will understand that the GNF signal alternatively may normally be HIGH, but may switch from HIGH to LOW if load current $I_{ac}$ exceeds the second predetermined threshold.

Persons of ordinary skill in the art will understand that grounded neutral detector circuit 16 alternatively may drive secondary winding 20 with an AC current having a specified magnitude $I_{ac}$ and a specified frequency $f_d$, and may monitor the drive voltage $V_{ac}$ across secondary winding 20. Grounded neutral detector circuit 16 may then generate the second detection signal GNF if the monitored drive voltage $V_{ac}$ is less than a predetermined value.

After the second predetermined time interval T2, grounded neutral fault detector circuit 16 ceases driving secondary winding 20, and ground current fault detector circuit 14 resumes monitoring differential current flowing in transformer 12. This process repeats in an iterative manner to continuously detect line-to-ground faults and low impedance ground-to-neutral faults.

As described above, interrupt circuit is used to open circuit line conductor L and thereby interrupt the AC power system based on first and second detection signals GCF and GNF, respectively. In particular, interrupt circuit 18 has a first input terminal coupled to the line conductor L at the SOURCE, a second input terminal coupled to an output terminal of ground current fault detector circuit 14 and to an output terminal of grounded neutral fault detector circuit 16, and an output terminal coupled to the line conductor L primary winding of transformer 12. The first input terminal is normally coupled to the output terminal unless the signal at the second input terminal has a predetermined value (e.g., HIGH). Thus, if GCF and GNF are both LOW, the line conductor L at the SOURCE is coupled to the line conductor L primary winding of transformer 12. If GCF or GNF go HIGH (indicating a ground current fault or a grounded neutral fault, respectively), the line conductor L at the SOURCE is disconnected from the line conductor L primary winding of transformer 12.

Persons of ordinary skill in the art will understand that interrupt circuit 18 alternatively may be located between transformer 12 and the LOAD. In such an alternative embodiment, if GCF and GNF are both LOW, the line conductor L primary winding of transformer 12 is coupled to the line conductor L at the LOAD. If GCF or GNF go HIGH (indicating a ground current fault or a grounded neutral fault, respectively), the line conductor L primary winding of transformer 12 is disconnected from the line conductor L at the LOAD.

Figure 2:
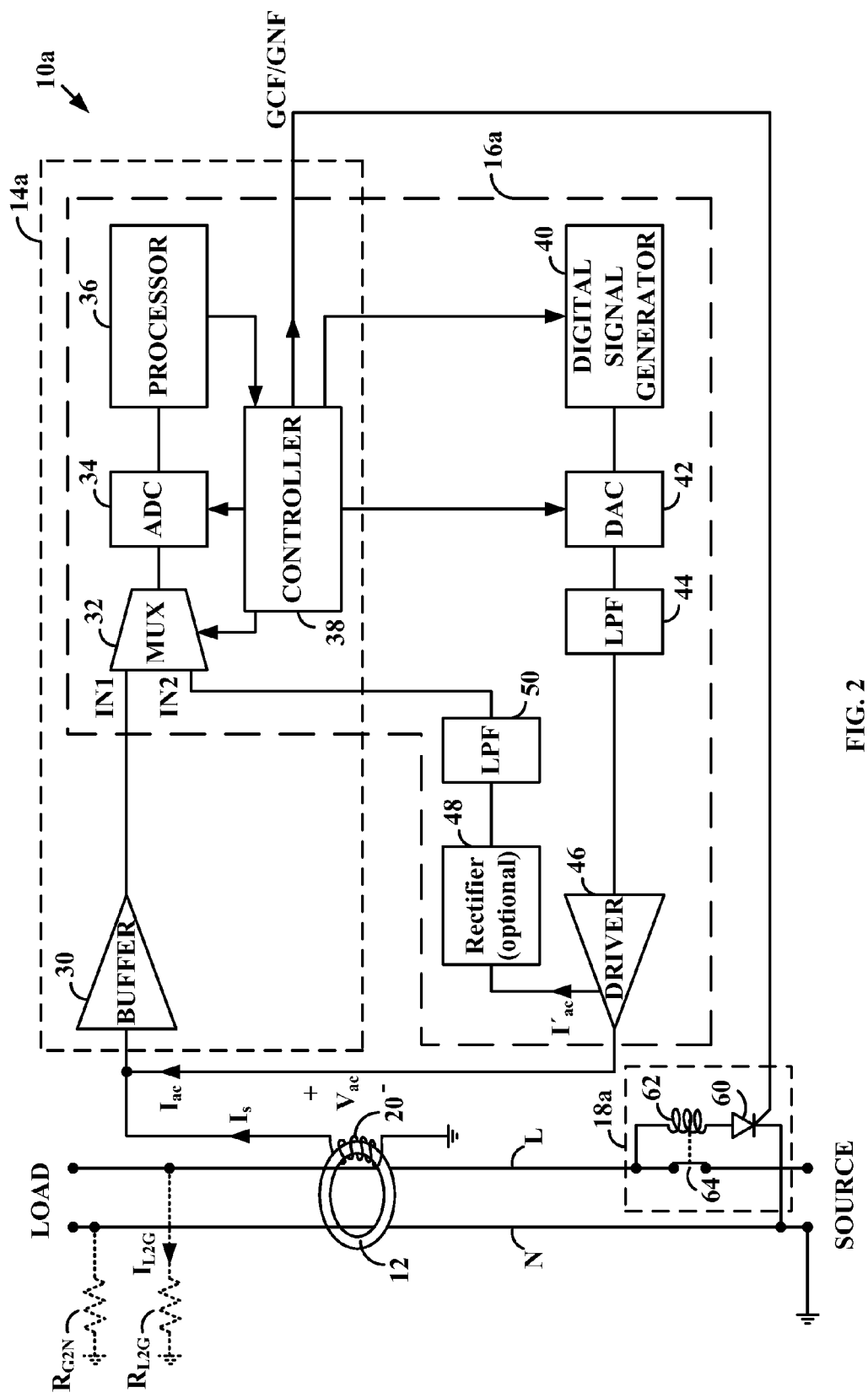
FIG. 2 is a more detailed block diagram of an exemplary GFCI device in accordance with this invention.

GFCI devices in accordance with this invention, such as GFCI device 10, may be implemented in digital circuitry, in analog circuitry, or a combination of digital and analog circuitry. Referring now to FIG. 2, an exemplary GCFI device 10a implemented using digital circuitry is described. GFCI device 10a includes single transformer 12, ground current fault detector circuit 14a, grounded neutral fault detector circuit 16a, and interrupt circuit 18a.

Exemplary ground current fault detector circuit 14a includes a buffer (or amplifier) 30 (referred to herein as "buffer/amp 30"), a multiplexor ("MUX") 32, an analog-to-digital converter ("ADC") 34, a processor 36 and a controller 38. Buffer/amp 30 has an input terminal coupled to secondary winding 20, and an output terminal coupled to a first input terminal IN1 of MUX 32. MUX 32 has a second input terminal IN2, a control terminal coupled to controller 38, and an output terminal coupled to an input terminal of ADC 34. ADC 34 also has a control terminal coupled to controller 38, and has an output terminal coupled to an input terminal of processor 36.

During first predetermined time interval T1, controller 38 inactivates grounded neutral fault detector circuit 16a, drive signal $V_{ac}$ is zero and load current $I_{ac}$ is zero. Thus, the output of buffer/amp 30 is the monitored secondary current $I_s$, which is coupled to input terminal IN1 on MUX 32. Controller 38 provides a control signal to MUX 32 to select the IN1 input as the output of MUX 32. ADC 34 samples the buffered (or amplified) secondary current $I_s$ signal and provides a digital count corresponding to secondary current $I_s$ to processor 36. Processor 36 may be a conventional microprocessor integrated circuit, or other similar processor. Alternatively, ADC 34 and processor 36 may be combined into a single device that includes a microprocessor and analog-to-digital converter, such as such as an ATTINY461A microcontroller by Atmel Corporation, San Jose, Calif., or a MSP430s microcontroller by Texas Instruments Incorporated, Dallas, Tex. Processor 36 processes the converted $I_s$ data to determine if ground leakage current $I_{L2G}$ exceeds the first predetermined threshold.

If ground leakage current $I_{L2G}$ exceeds the first predetermined threshold, digital ground fault detector 36 provides an output signal to controller 38 indicating that a ground current fault exists. Controller 38 in turn provides a first detection signal GCF to interrupt circuit 18a. In the illustrated embodiment, interrupt circuit 18a includes a thyristor 60 coupled to a trip coil 62 and having a control input coupled to controller 38. Interrupt circuit 18a also includes contacts 64 coupled to trip solenoid 62. First detection signal GCF causes thyristor 60 to conduct, which in turn energizes trip solenoid 62, and causes contacts 64 to open, and thereby interrupt the AC power system.

As previously mentioned, during first predetermined time interval T1, controller 38 inactivates grounded neutral fault detector circuit 16a. After first predetermined time interval T1, controller 38 activates grounded neutral fault detector circuit 16a for second predetermined time interval T2.

In particular, grounded neutral fault detector circuit 16a includes a digital signal generator 40 having an output terminal coupled to an input terminal of a digital-to-analog converter ("DAC") 42, a first lowpass filter ("LPF") 44 having an input terminal coupled to an output terminal of DAC 42, a driver 46 having an input terminal coupled to an output terminal of LPF 44, an optional rectifier 48 having an input terminal coupled to an output of driver 46, a second LPF 50 having an input terminal coupled to an output terminal of rectifier 48, and MUX 32 having a second input terminal IN2 coupled to an output of LPF 50. Grounded neutral fault detector circuit 16a also includes ADC 34, digital GF detector 36 and controller 38, described above.

After first predetermined time interval T1, controller 38 turns ON digital signal generator 40, which provides digital data to DAC 42 to generate an analog output signal having a specified magnitude and frequency. In accordance with this invention, digital signal generator 40 and DAC 42 may be used to generate an AC signal having a specified magnitude and a specified frequency that each may be individually controlled.

The output of DAC 42 is smoothed by LPF 44, and the output of LPF 44 is output to transformer 12 via driver 46. In the exemplary embodiment of FIG. 2, grounded neutral fault detector circuit 16a drives secondary winding 20 with an AC voltage $V_{ac}$, and monitors load current $I_{ac}$ conducted by secondary winding 20.

In particular, driver 46 may include a current mirror that provides a mirrored load current $I'_{ac}$ that is substantially equal to load current $I_{ac}$. Mirrored load current $I'_{ac}$ may be processed by optional rectifier 48, which may be a full wave rectifier or other similar rectifier circuit, to provide a rectified output signal that is smoothed by LPF 50, and coupled to the second input IN2 of MUX 32. Thus, IN2 receives a signal corresponding to mirrored load current $I'_{ac}$.

During second predetermined time interval T2, controller 38 provides a control signal to MUX 32 to select the IN2 input as the output of MUX 32. ADC 34 samples the mirrored load current $I'_{ac}$ signal and provides a digital count corresponding to mirrored load current $I'_{ac}$ to digital ground fault detector 36. Digital ground fault detector 36 processes the converted $I'_{ac}$ data to determine if load current $I_{ac}$ exceeds a predetermined value (indicating that $R_{G2N}$ has decreased below a second predetermined threshold).

If $R_{G2N}$ is less than the second predetermined threshold, digital ground fault detector 36 provides an output signal to controller 38 indicating that a grounded neutral fault exists. Controller 38 in turn provides a second detection signal GNF to interrupt circuit 18a. Second detection signal GNF causes thyristor 60 to conduct, which in turn energizes trip solenoid 62, and causes contacts 64 to open, and thereby interrupt the AC power system.

After the second predetermined time interval T2, controller 38 turns OFF digital signal generator 40, and ground current fault detector circuit 14 resumes monitoring differential current flowing in transformer 12. This process repeats in an iterative manner to continuously detect line-to-ground faults and low impedance ground-to-neutral faults.

Figure 3:
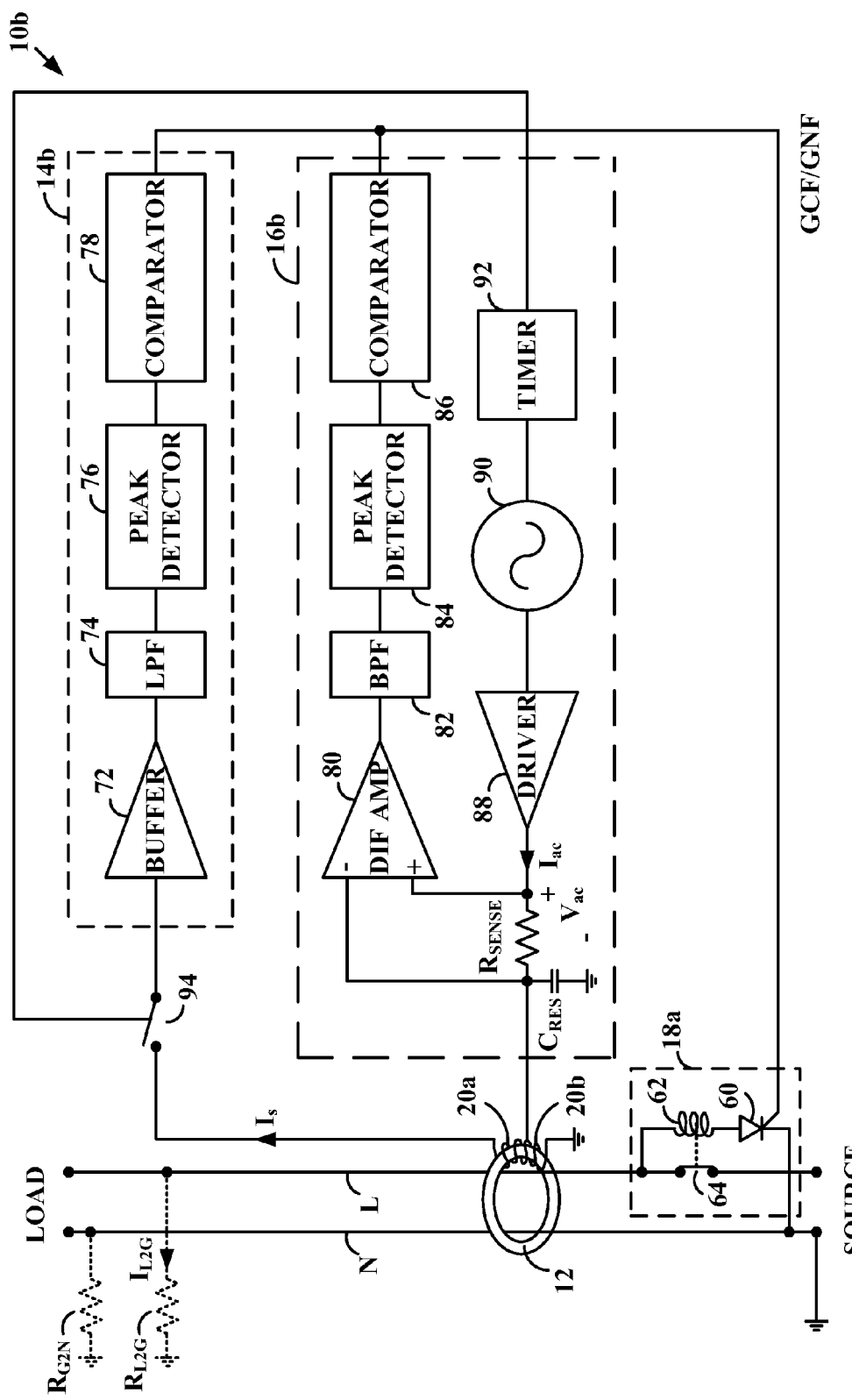
FIG. 3 is a block diagram of an alternative exemplary GFCI device in accordance with this invention.

As previously mentioned, GFCI devices in accordance with this invention alternatively may be implemented using analog circuitry. Referring now to FIG. 3, an exemplary GCFI device 10b implemented using analog circuitry is described. GFCI device 10b includes transformer 12, ground current fault detector circuit 14b, grounded neutral fault detector circuit 16b, interrupt circuit 18a and controlled switch 94. Transformer 12 has a secondary winding 20 having a first tapped output 20a having $N_{sa}$ turns, and a second tapped output 20b having $N_{sb}$ turns.

Exemplary ground current fault detector circuit 14b includes a buffer (or amplifier) 72 (referred to herein as "buffer/amp 72") having an input terminal coupled through controlled switch 94 to secondary winding 20, and has an output terminal coupled to an input terminal of LPF 74. LPF 74 has an output terminal coupled to an input terminal of peak detector 76, which has an output terminal coupled to an input terminal of comparator 78. Comparator 78 has an output terminal coupled to an input terminal of thyristor 60.

During first predetermined time interval T1, a timer circuit (timer 92, described below) closes controlled switch 94, and inactivates grounded neutral fault detector circuit 16b. As a result, drive signal $V_{ac}$ is zero and load current $I_{ac}$ is zero. Thus, the output of buffer/amp 72 is the monitored secondary current $I_s$, which is smoothed by LPF 74, and the smoothed secondary current $I_s$ signal is coupled to the input of peak detector 76. Peak detector 76 provides a DC output voltage equal to the peak value of the secondary current $I_s$. The peak detector output is provided as an input to comparator 78.

Comparator 86 provides an output signal that changes state (e.g., switches from LOW to HIGH) if the peak load current $I_{ac}$ has a value exceeding Vac divided by the second predetermined threshold times $N_{sb}^2$ (i.e., if low impedance ground-to-neutral fault $R_{G2N}$ is less than a second predetermined threshold). Thus, comparator 86 provides a second detection signal GNF to interrupt circuit 18a. Second detection signal GNF causes thyristor 60 to conduct, which in turn energizes trip solenoid 62, and causes contacts 64 to open, and thereby interrupt the AC power system.

As previously mentioned, during first predetermined time interval T1, grounded neutral fault detector circuit 16b is inactive. After first predetermined time interval T1, ground current fault detector circuit 14b is inactive, and grounded neutral fault detector circuit 16b is active for second predetermined time interval T2.

In particular, grounded neutral fault detector circuit 16b includes a differential amplifier 80, a bandpass filter ("BPF") 82, a peak detector 84, a comparator 86, a timer circuit 92, an AC signal generator 90, a driver 88, a sense resistor $R_{SENSE}$, and a capacitor $C_{RES}$. After first predetermined time interval T1, timer circuit opens controlled switch 94, which effectively inactivates ground current fault detector circuit 14b, and activates AC source 90.

AC source 90 may be an oscillator that provides an AC signal (e.g., and AC voltage or AC current) to driver 88. AC source 90 may generate a sinusoidal signal, or alternatively may generate a non-sinusoidal waveform, such as a squarewave, ramp, or other similar waveform. In accordance with this invention, AC source 90 generates an AC signal having a specified magnitude and a specified frequency that each may be individually controlled.

In the embodiment shown in FIG. 3, AC source 90 provides an AC voltage signal to driver 88, which provides an AC output signal $V_{ac}$ to second tapped output 20b of secondary winding 20. Thus, during second predetermined time interval T2, grounded neutral fault detector circuit 16b drives secondary winding 20 with an AC voltage signal $V_{ac}$.

Differential amplifier 80 measures the voltage across sense resistor $R_{SENSE}$ to monitor load current $I_{ac}$ supplied by driver 88. $R_{SENSE}$ may have a value of between about 1 and 10 ohms, although other resistance values may be used depending upon the number of turns of the secondary winding the driver and sensitivity of the detection circuit. The output of differential amplifier 80 is filtered by BPF 82, and the filtered output is coupled to peak detector 84 and comparator 86. Peak detector 84 provides a DC output voltage equal to the peak value of load current $I_{ac}$. The peak detector output is provided as an input to comparator 86.

Comparator 86 provides an output signal that changes state (e.g., switches from LOW to HIGH) if the peak load current $I_{ac}$ has a value exceeding Vac divided by the second predetermined threshold times $N_{sb}^2$ (i.e., if low impedance ground-to-neutral fault $R_{G2N}$ is less than a second predetermined threshold is less than the second predetermined threshold). Thus, comparator 86 provides a second detection signal GNF to interrupt circuit 18a. Second detection signal GNF causes thyristor 60 to conduct, which in turn energizes trip solenoid 62, and causes contacts 64 to open, and thereby interrupt the AC power system.

Figure 4:
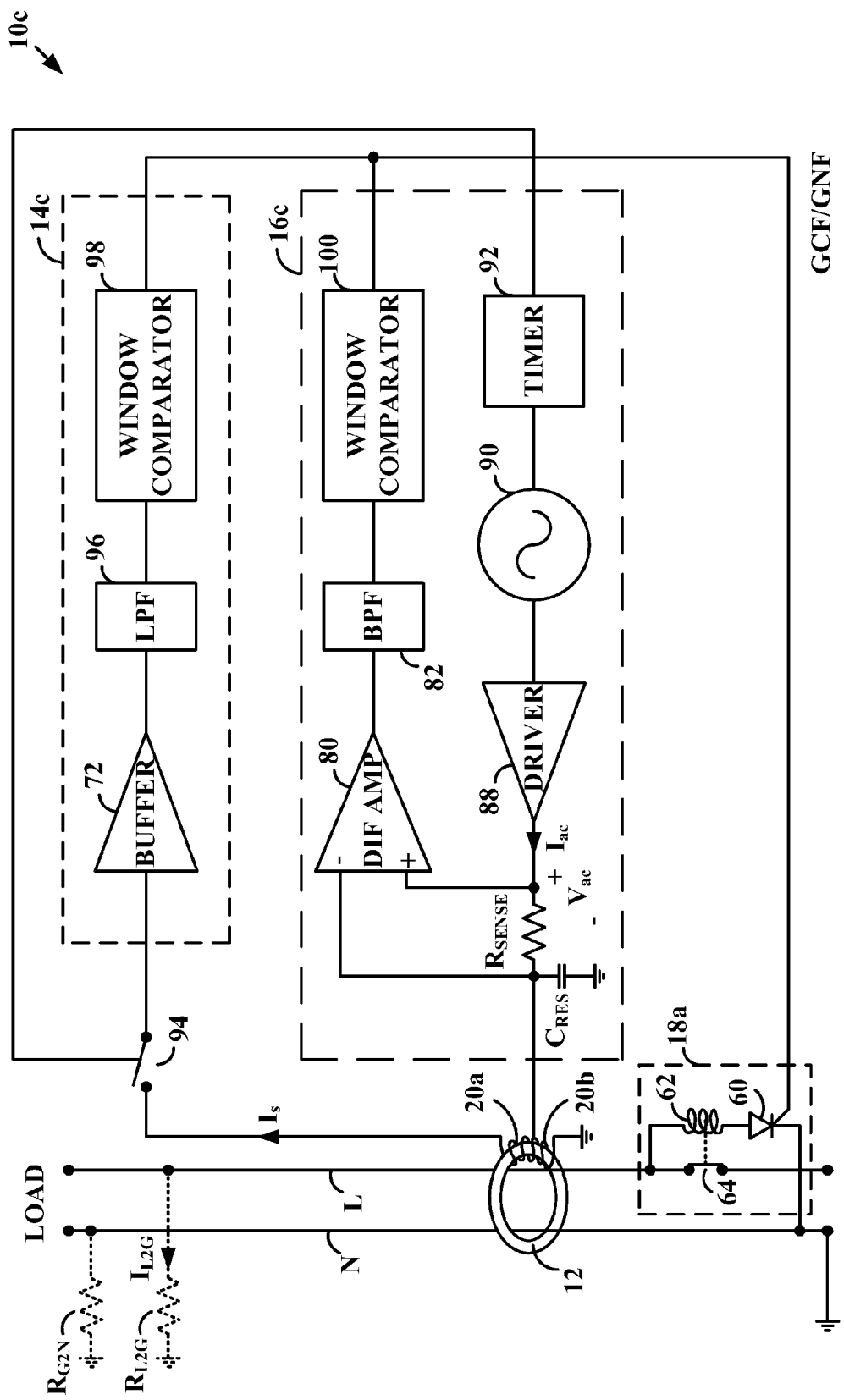
FIG. 4 is a block diagram of another alternative exemplary GFCI device in accordance with this invention.

Referring now to FIG. 4, another alternative exemplary GCFI device 10c implemented using analog circuitry is described. GFCI device 10c is similar to GFCI device 10b, but replaces the peak detectors 76/84 and comparators 78/86 with window comparators 98 and 100, respectively, that toggle on both positive and negative peaks. In this regard, GCFI device 10c may respond more quickly to ground current faults and grounded neutral faults.

Figure 5:
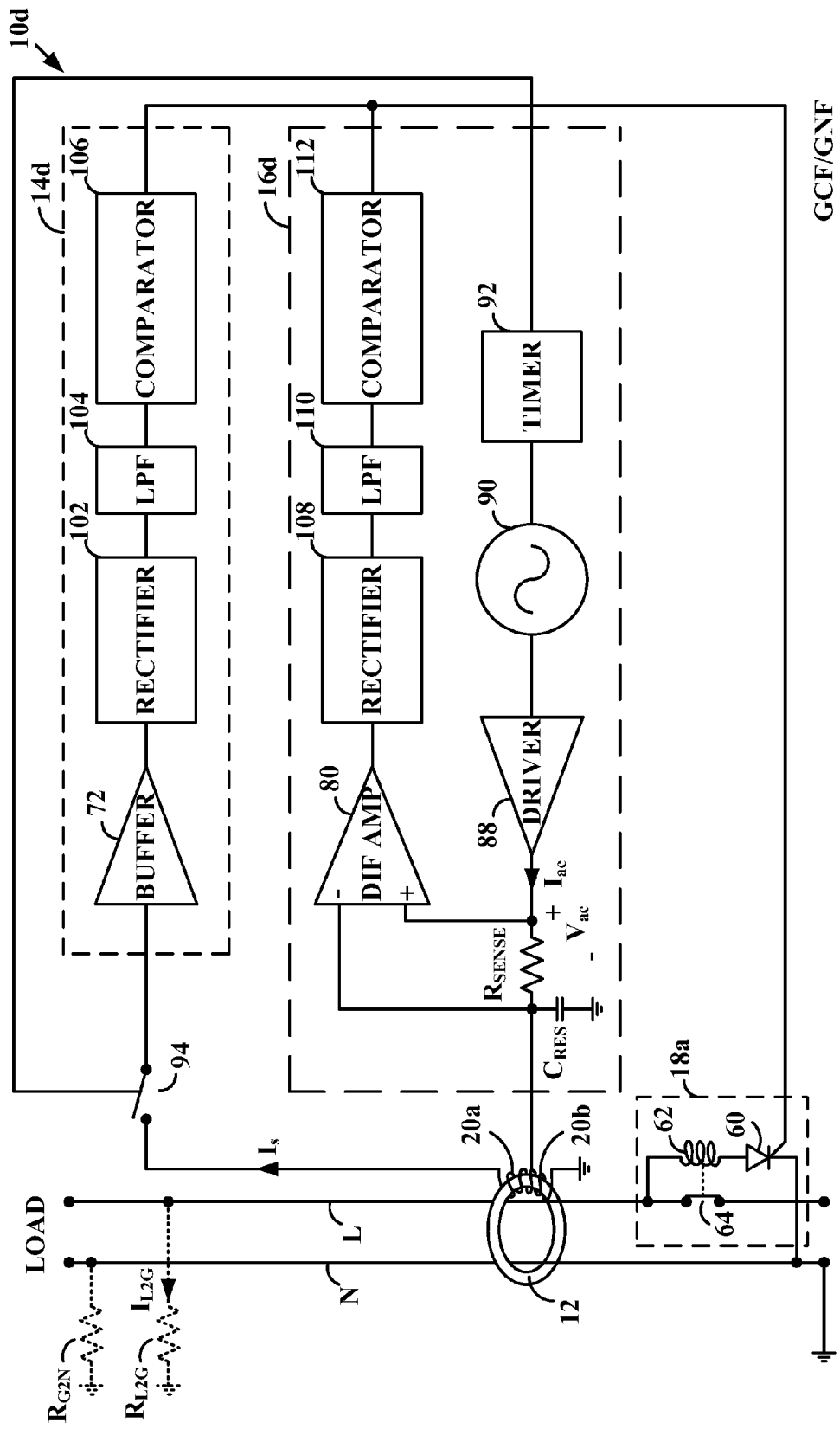
FIG. 5 is a block diagram of still another alternative exemplary GFCI device in accordance with this invention.

Referring now to FIG. 5, yet another alternative exemplary GCFI device 10d implemented using analog circuitry is described. GFCI device 10d is similar to GFCI device 10b, but implements peak detectors 76 and 84 with rectifiers 102 and 108, and LPFs 104 and 110, respectively. Rectifiers 102 and 108 may be full-wave or half-wave rectifiers.

The foregoing merely illustrates the principles of this invention, and various modifications can be made by persons of ordinary skill in the art without departing from the scope and spirit of this invention.

What is claimed is:

1. A device for use with an AC power system that includes a line conductor, a neutral conductor and a transformer, the line conductor and the neutral conductor each coupled between a source and a load, the neutral conductor coupled to ground at the source, wherein the transformer includes a first primary winding coupled in series with the line conductor, a second primary winding coupled in series with the neutral conductor, and a secondary winding, the device comprising:
   a first circuit coupled to the secondary winding, wherein the first circuit provides a first detection signal if a current from the line conductor to ground exceeds a first predetermined threshold; and
   a second circuit coupled to the secondary winding, wherein the second circuit includes an AC signal source that supplies an AC signal, which exists prior to coupling to the secondary winding, at a specified amplitude and a specified frequency to the secondary winding, wherein a response from the secondary winding is at a same frequency as the specified frequency, and wherein the second circuit provides a second detection signal if an impedance between the neutral conductor and ground is less than a second predetermined threshold.

2. The device of claim 1, further comprising an interrupt circuit coupled to the line conductor, wherein the interrupt circuit interrupts power in the AC power system if the first circuit provides the first detection signal, and/or if the second circuit provides the second detection signal.

3. The device of claim 2, wherein the interrupt circuit is disposed between the source and the transformer.

4. The device of claim 2, wherein the interrupt circuit is disposed between the load and the transformer.

5. The device of claim 1, wherein the secondary winding comprises a single winding shared by the first circuit and the second circuit.

6. The device of claim 1, wherein the secondary winding comprises a tapped output coupled to the second circuit.

7. The device of claim 1, wherein the secondary winding comprises a first secondary winding coupled to the first circuit, and a second secondary winding coupled to the second circuit, wherein the first secondary winding and the second secondary winding are separate windings.

8. The device of claim 1, wherein the first circuit comprises digital circuitry.

9. The device of claim 1, wherein the first circuit comprises a digital ground fault detector circuit that provides the first detection signal if a current in the secondary winding exceeds the first predetermined threshold.

10. The device of claim 1, wherein the second circuit comprises digital circuitry.

11. A method for ground fault circuit interrupt ("GFCI") detection for use with an AC power system that includes a line conductor, a neutral conductor and a transformer, the line conductor and the neutral conductor each coupled between a source and a load, the neutral conductor coupled to ground at the source, wherein the transformer includes a first primary winding coupled in series with the line conductor, a second primary winding coupled in series with the neutral conductor, and a secondary winding, the method comprising:
   (a) for a first predetermined time interval:
      (i) monitoring a current in the secondary winding, and (ii) providing a first detection signal if the monitored secondary current exceeds a first predetermined threshold; and (b) for a second predetermined time interval:
  (i) driving the secondary winding with an AC voltage or current, which exists prior to driving the secondary winding, at a specified amplitude and a specified frequency;
  (ii) monitoring a load current in or voltage across the secondary winding, wherein a response from the secondary winding is at a same frequency as the specified frequency; and
  (iii) providing a second detection signal if the load current or load exceeds a predetermined threshold, or if the load voltage is less than a predetermined threshold.

12. The method of claim 11, further comprising iteratively repeating step (a) and then step (b).

13. The method of claim 11, further comprising interrupting power in the AC power system in response to the first detection signal and/or the second detection signal.

14. The method of claim 11, wherein the first predetermined time interval is between about 1 and 560 milliseconds.

15. The method of claim 11, wherein the first predetermined time interval is about 100 milliseconds.

16. The method of claim 11, wherein the second predetermined time interval is between about 0.1 and 17 milliseconds.

17. A method for ground fault circuit interrupt ("GFCI") detection for use with an AC power system that includes a line conductor, a neutral conductor and a transformer, the line conductor and the neutral conductor each coupled between a source and a load, the neutral conductor coupled to ground at the source, wherein the transformer includes a first primary winding coupled in series with the line conductor, a second primary winding coupled in series with the neutral conductor, and a secondary winding, the method comprising:

(a) for a first predetermined time interval:
  (i) monitoring a current in the secondary winding, and
  (ii) providing a first detection signal if the monitored secondary current exceeds a first predetermined threshold; and (b) for a second predetermined time interval:
  (i) driving the secondary winding with an AC voltage or current signal, which exists prior to driving the secondary winding, at a specified amplitude and a specified frequency;
  (ii) monitoring a load current in or voltage across the secondary winding, wherein a response from the secondary winding is at a same frequency as the specified frequency; and
  (iii) providing a second detection signal if the load current or load exceeds a predetermined threshold, or if the load voltage is less than a predetermined threshold.

18. The method of claim 17, further comprising iteratively repeating step (a) and then step (b).

19. The method of claim 17, further comprising interrupting power in the AC power system in response to the first detection signal and/or the second detection signal.

20. The method of claim 17, wherein the first predetermined time interval is between about 1 and 560 milliseconds and wherein the second predetermined time interval is between about 0.1 and 17 milliseconds.

* * * * *